United States Patent [19]

Nakayama et al.

[11] 3,917,511

[45] *Nov. 4, 1975

[54] PROCESS FOR PREPARING L-PHENYLALANINE

[75] Inventors: Kiyoshi Nakayama, Sagamihara; Hiroshi Hagino, Tokyo, both of Japan

[73] Assignee: Kyowa Hakko Kogyo Kabushiki Kaisha, Tokyo, Japan

[ * ] Notice: The portion of the term of this patent subsequent to Sept. 18, 1990, has been disclaimed.

[22] Filed: Mar. 26, 1973

[21] Appl. No.: 345,226

Related U.S. Application Data

[63] Continuation-in-part of Ser. No. 163,486, July 16, 1971, Pat. No. 3,759,790.

[30] Foreign Application Priority Data

July 29, 1970 Japan................................ 45-65755

[52] U.S. Cl..................................... 195/29; 195/47
[51] Int. Cl.²......................................... C12D 13/06
[58] Field of Search................................ 195/29, 47

[56] References Cited

UNITED STATES PATENTS

| | | | |
|---|---|---|---|
| 3,660,235 | 5/1972 | Okumura et al...................... | 195/29 |
| 3,759,790 | 9/1973 | Nakayama et al................... | 195/47 |

*Primary Examiner*—Alvin E. Tanenholtz
*Attorney, Agent, or Firm*—Phillips, Moore, Weissenberger, Lempio & Strabala

[57] ABSTRACT

L-phenylalanine is produced in substantial yield by fermentation from an L-phenylalanine-producing strain of Microbacterium ammoniaphilum. Specifically mutated strains of the above noted bacteria that exhibit resistance to at least one compound selected from the group consisting of tyrosine, phenylalanine and analogues thereof, produce large amounts of L-phenylalanine when cultured in a suitable nutrient medium.

4 Claims, No Drawings

PROCESS FOR PREPARING L-PHENYLALANINE

CROSS REFERENCE TO RELATED APPLICATION

This application is a continuation-in-part of our application Ser. No. 163,486 filed July 16, 1971 now U.S. Pat. No. 3,759,790, for which priority was claimed under Japanese application Serial No. 65,755/70 filed July 29, 1970, and for which priority is also claimed in this continuation-in-part.

DETAILED DESCRIPTION OF THE INVENTION

The present invention relates to a process for preparing L-phenylalanine, whereby an L-phenylalanine producing strain of Microbacterium ammoniaphilum is cultured in a nutrient medium to produce and accumulate L-phenylalanine in the fermented broth, from which L-phenylalanine is isolated for recovering.

Among known processes for preparing L-phenylalanine by fermentation is included a process using a microorganism which requires tyrosine for growth (Japanese Patent Publication No. 6345/62). But this process can hardly be applicable to the production of L-phenylalanine on a large scale and with cheaper costs because of its low production yield.

We have discovered that strains Microbacterium ammoniaphilum which exhibit resistance to at least one compound selected from the group consisting of tyrosine, phenylalanine, and analogue thereof (such as e.g. 2-fluorophenylalanine, 3-fluorophenylalanine, 4-fluorophenylalanine, 2-methylphenylalanine, 3-methylphenylalanine, 4-methylphenylalanine, 2-hydroxyphenylalanine, 3-hydroxyphenylalanine, 2-aminophenylalanine, 3-aminophenylalanine, 4-aminophenylalanine, 2-nitrophenylalanine, 4-nitrophenylalanine, $\beta$-2-thienylalanine, $\beta$-3-thienylalanine, 2-indole alanine, 1-naphthyl alanine, 2-naphthyl alanine, 2-pyridyl alanine, 2-thiazole alanine, 3-thiazole alanine, 3-aminotyrosine, 3-fluorotyrosine, 3-hydroxytyrosine, 3-nitrotyrosine, 5-hydroxy-2-pyridyl alanine, phenyl alanine hydroxamate, etc.) are capable of producing and accumulating a large amount of L-phenylalanine.

Mutant strains of Microbacterium ammoniaphilum having the above-mentioned properties may be used for the purpose of the process of the present invention.

Specimen cultures of these Microbacterium ammoniaphilum microorganism identified by ATCC No. 21645 have been deposited with the American Type Culture Collection located at 12301 Parklawn Drive, Rockville, Maryland 20852, U.S.A., and specimens thereof are freely available to qualified persons without our permission.

The strains which may be used for the process of the present invention and whose properties are described above, can be obtained by subjecting certain strains belonging to the said bacteria to mutation such as e.g. irradiation by ultraviolet light, X-ray, cobalt 60, etc. and chemical treatment, etc. and then screening the strains for isolation from colonies capable of growing on agar plate media containing tyrosine, phenylalanine, or analogues thereof. For example, L-phenylalanine producing strains which are resistant to 4-fluorophenylalanine are selected and isolated from colonies grown on a plate containing 100–10,000 $\mu$g/ml of 4-fluorophenylalanine. Among these strains are included some strains capable of growing in 4-fluorophenylalanine containing media at high concentration.

When a parent strain is subjected to a series of mutation treatments, it is possible to obtain the mutant strain having resistance to two or more of the said compounds.

Any of synthetic or natural media may be used for the purpose of the present invention if they contain suitable amounts of nitrogen sources, carbon sources, inorganic materials as well as trace amounts of nutrients required for growth of the used strain, as shown in the Example.

Preferable carbon sources are exemplified by various carbohydrates such as glucose, glycerol, fructose, sucrose, maltose, mannose, starch, starch hydrolyzate, molasses, etc. It is also possible to use as carbon sources various organic acids such as pyruvic acid, lactic acid, acetic acid, fumaric acid, etc.

Preferable nitrogen sources include, for example, ammonia, various inorganic and organic ammonium salts such as ammonium chloride, ammonium sulfate, ammonium carbonate, ammonium acetate, urea and other nitrogen-containing materials as well as various other nitrogeneous organic materials such as peptone, NZ-amine, meat extract, yeast extract, corn steep liquor, casein hydrolyzate, fish meal orits digested material, defatted soybean or its digested material, chrysalis hydrolyzate, etc.

It is also possible to use as inorganic materials potassium monohydrogen phosphate, potassium dihydrogen phosphate, magnesium sulfate, sodium chloride, ferrous sulfate, manganese sulfate, calcium carbonate, etc. In case the utilized strain requires traceable amounts of nutritional elements such as vitamins, amino acids, etc., these nutrients are added to the medium. But it is not necessary to add them intentionally to the medium when they are sufficiently contained in other ingredients of the medium.

The strain is cultured under aerobic conditions, for example, by culturing with shaking, aeration-agitation, etc. The preferable culture temperature is, in general, from 20° – 40° C. The pH of the medium is preferably maintained at from 4 to 8 during the cultivation. However, other temperatures and pH conditions may also be used, if desired. The time for culture is usually from 2 days to 5 days to accumulate a substantial amount of L-phenylalanine in the medium.

After the completion of the cultivation, microbial cells are first removed from the fermented broth, and then L-phenylalanine is recovered therefrom in a suitable manner such as by using activated carbon treatment, ion exchange resin treatment, etc., as shown in the examples.

The following nonlimiting example illustrates the invention.

EXAMPLE

An L-phenylalanine-producing strain of Microbacterium ammoniaphilum (ATCC 21645) previously screened as being resistant to an analogue of phenylalanine (4-fluorophenylalanine) was cultured at 30°C for 24 hours in a seed medium containing glucose (2 percent), peptone (1 percent), yeast extract (1 percent) and NaCl (0.3 percent). The resultant seed (1 ml) was inoculated into a fermentation medium (10 ml) in a 250 ml Erlenmeyer flask and cultured with shaking at 30° for fpr 4 days to produce 4.7 mg/ml of L-phenylalanine from the culture broth.

The composition of the fermentation medium used herein was glucose (10 percent), $K_2HPO_4$ (0.05 percent), $KH_2PO_4$ (0.05 percent), $MgSO4 \cdot 7H_2O$ (0.025 percent), ammonium sulfate (2 percent), NZ-amine (0.5 percent), biotin (30 mg/l) and $CaCO_3$ (2 percent) (pH: 7.2).

After the completion of the fermentation, 1 liter of the cultured broth was centrifuged to remove microbial cells and $CaCO_3$. The resultant liquor was mixed with active charcoal which had previously been treated with acetic acid and was thoroughly mixed to adsorb phenylalanine thereon. The charcoal was separated by filtration and was washed with water. The charcoal was eluted with 20 percent (v/v) acetic acid containing phenol (5 percent v/v) and the eluate was treated with ether. After the removal of phenol, the eluate was concentrated and was passed through a column of a strongly acidic cation exchange resin (Diaion SK-1A) ($H^+$ form) to adsorb phenylalanine which was then eluted with 0.3 percent aqueous ammonia. The phenylalanine fraction of the eluate was concentrated and precipitated with alcohol to recover 1.6 g of L-phenylalanine.

What is claimed is:

1. A process for producing L-phenylalanine by fermentation which comprises culturing in a nutrient medium an L-phenylalanine-producing mutant strain of Microbacterium ammoniaphilum having the property of resistance to at least one compound selected from the group consisting of tyrosine, phenylalanine and analogues thereof to produce and accumulate L-phenylalanine in the culture liquor, and thereafter recovering the L-phenylalanine from the culture liquor.

2. The process of claim 1 in which said mutant strain is Microbacterium ammoniaphilum ATCC 21645.

3. The process of claim 1 in which the nutrient medium includes a nitrogen source, a carbon source and inorganic nutrient materials.

4. The process of claim 1 in which the culturing is carried out aerobically at a temperature of from about 20°C to about 40°C at a pH of from 4 to 8 for 2 to 5 days.

* * * * *